United States Patent
Sweeney et al.

(10) Patent No.: US 10,890,114 B2
(45) Date of Patent: Jan. 12, 2021

(54) SYSTEM AND METHOD FOR STABILIZING TRANSCRITICAL AIR-TO-FUEL HEAT EXCHANGE

(71) Applicant: Rolls-Royce Corporation, Indianapolis, IN (US)

(72) Inventors: Patrick C. Sweeney, Indianapolis, IN (US); Stephen D. Heister, West Lafayette, IN (US); Steven A. Hunt, West Lafayette, IN (US); Carlo Scalo, West Lafayette, IN (US); Mario Tindaro Migliorino, West Lafayette, IN (US)

(73) Assignees: Rolls-Royce Corporation, Indianapolis, IN (US); Purdue Research Foundation, West Lafayette, IN (US)

( * ) Notice: Subject to any disclaimer, the term of this patent is extended or adjusted under 35 U.S.C. 154(b) by 666 days.

(21) Appl. No.: 15/473,759

(22) Filed: Mar. 30, 2017

(65) Prior Publication Data
US 2017/0321607 A1     Nov. 9, 2017

Related U.S. Application Data

(60) Provisional application No. 62/332,161, filed on May 5, 2016.

(51) Int. Cl.
F02C 7/18        (2006.01)
F02C 7/224       (2006.01)

(52) U.S. Cl.
CPC .............. *F02C 7/185* (2013.01); *F02C 7/224* (2013.01); *F05D 2260/213* (2013.01); *Y02T 50/60* (2013.01)

(58) Field of Classification Search
CPC ..................... B64D 37/34; F05D 2260/213
See application file for complete search history.

(56) References Cited

U.S. PATENT DOCUMENTS

| 4,104,873 A | 8/1978 | Coffinberry |
| 2009/0188232 A1 | 7/2009 | Suciu et al. |
| 2014/0090395 A1* | 4/2014 | Appukuttan ............ F02C 7/185 60/776 |

FOREIGN PATENT DOCUMENTS

GB        2 095 756 A     10/1982

OTHER PUBLICATIONS

"Heat transfer in Flow Through Conduits" Web page <https://web2.clarkson.edu/projects/subramanian/ch330/notes/Heat Transfer in Flow Through Conduits.pdf>, 9 pages, Mar. 19, 2015, retrieved from Internet Archive Wayback Machine on Nov. 6, 2019 (Year: 2015).*
Herring, N., On the Development of Compact, High Performance Heat Exchangers for Gas Turbine Applications, Purdue University, Aug. 2007, 271 pages.
Palumbo, M., Predicting the Onset of Thermoacoustic Oscillations in Supercritical Fluids, Purdue University, Oct. 16, 2009, 176 pages.
(Continued)

*Primary Examiner* — Gerald L Sung
*Assistant Examiner* — Jacek Lisowski
(74) *Attorney, Agent, or Firm* — Barnes & Thornburg LLP (57) ABSTRACT

A gas turbine engine includes devices, systems, and methods for design and operation of stabilizing heat exchangers for gas turbine engines in consideration of near supercritical fuel flow conditions.

33 Claims, 5 Drawing Sheets

(56) References Cited

OTHER PUBLICATIONS

Hines, W. S., and Wolf, H., "Pressure Oscillations Associated With Heat Transfer to Hydrocarbon Fluids at Supercritical Pressures and Temperatures," ARS Journal, vol. 32, Jan. 1962, pp. 361-366.

Hui Wang, JinZhou, YuPan, NingWang "Experimental investigation on the onset of thermo-acoustic instability of supercritical hydrocarbon fuel flowing in a small-scale channel" ActaAstronautica117(2015)296-304, Elsevier Inc.

Faith, L. E., Ackerman, G. H, and Henderson, H. T., Heat Sink Capability of Jet A Fuel: Heat Transfer and Coking Studies, Shell Development Company, 1971, 132 pages.

Linne, D., and Meyer, M., "Evaluation of Heat Transfer and Thermal Stability of Supercritical JP-7 Fuel," NASA, Seattle, WA: 1997, 20 pages.

Linne, D., Meyer, M., Braun, D., and Keller, D., "Investigation of Instabilities and Heat Transfer Phenomena in Supercritical Fuels at High Heat Flux and Temperatures," NASA, Jul. 2000, 32 pages.

Hitch, B., and Karpuk, M., "Enhancement of Heat Transfer and Elimination of Flow Oscillations in Supercritical Fuels," Seattle, WA, 1997, 8 pages.

European Search Report for corresponding EP 17169591.9; dated Oct. 19, 2017.

\* cited by examiner

SYSTEM AND METHOD FOR STABILIZING TRANSCRITICAL AIR-TO-FUEL HEAT EXCHANGE

CROSS-REFERENCE TO RELATED APPLICATIONS

This application claims priority to and the benefit of U.S. Provisional Application No. 62/332,161, filed May 5, 2016, the contents of which are incorporated herein in their entirety, including but not limited to, those portions concerning transcritical stability in heat exchange.

BACKGROUND

The present disclosure relates generally to gas turbine engines, and more specifically to stable operation of gas turbine engine components.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller.

Cooling air is often routed to various portion of gas turbine engines to remove heat therefrom. Cooling air may be cooled by a heat exchanger before being distributed to those portions of the gas turbine engine.

SUMMARY

The present disclosure may comprise one or more of the following features and combinations thereof.

According to an aspect of the present disclosure, a method of operating a stabilizing heat exchanger of a gas turbine engine providing thermal communication between cooling air as a heat source and fuel as a heat sink to resist supercritical fluid oscillations may include providing a transcritical stability profile of the stabilizing heat exchanger based on a comparison between a dimensionless relationship of mean fuel pressure and dynamic fuel pressure ($\pi_f$) and a dimensionless relationship of thermal energy transport and kinetic energy transport ($\pi_e$) of the fuel, the transcritical stability profile defining a stable region and an unstable region of heat sink operations, determining a desired flowrate of the cooling air to be directed through the stabilizing heat exchanger that maintains the heat sink operations within the stable region according to current heat sink conditions, and bypassing a portion of the cooling air from entering the stabilizing heat exchanger to maintain the desired flowrate of the cooling air through the stabilizing heat exchanger.

In some embodiments, the stabilizing heat exchanger may be a fuel-to-air heat exchanger having a fuel passage and a cooling air passage in thermal communication with each other. The transcritical stability profile may include a comparison between the dimensionless relationship of thermal energy transport and kinetic energy transport ($\pi_e$) and the dimensionless relationship of mean fuel pressure and dynamic fuel pressure ($\pi_f$) within the fuel passage of the stabilizing heat exchanger. The dimensionless relationship of mean fuel pressure and dynamic fuel pressure ($\pi_f$) may be based on a diameter of the fuel passage (D), a density of the fuel ($\rho$), a mean static fuel pressure ($p_{mean}$), and a mass flow rate ($\dot{m}$).

In some embodiments, the dimensionless relationship of mean fuel pressure and dynamic fuel pressure ($\pi_f$) may be defined by the equation:

$$\frac{D^4 * \rho * p_{mean}}{\dot{m}^2}.$$

In some embodiments, the dimensionless relationship of thermal energy transport and kinetic energy transport ($\pi_e$) may be based on a diameter of the fuel passage (D), a density of the fuel ($\rho$), a heat input rate ($\dot{Q}$), and a mass flow rate ($\dot{m}$). In some embodiments, the dimensionless relationship of thermal energy transport and kinetic energy transport ($\pi_e$) may be defined by the equation:

$$\frac{D^4 * \rho^2 * \dot{Q}}{\dot{m}^3}.$$

In some embodiments, the stable region may include an area below a curve on a graph having the dimensionless relationship of mean fuel pressure and dynamic fuel pressure ($\pi_f$) on the horizontal axis and the dimensionless relationship of thermal energy transport and kinetic energy transport ($\pi_e$) on the vertical axis, the curve being defined by the equation: $\pi_e = (8.643 * \pi_f)^{1.155} - 2.945 \times 10^6$.

According to another aspect of the present disclosure, a gas turbine engine may include a fuel system adapted to provide fuel to a combustor of the engine in an amount ranging between a minimum and a maximum value according to engine operating parameters, a compressor for providing pressurized air to the combustor of the engine, and a stabilizing heat exchanger including a fuel side passage fluidly coupled with the fuel system to conduct fuel therethrough, an air side passage fluidly coupled with the compressor to receive pressurized air therethrough. In some embodiments, the fuel side passage and the air side passage may be arranged in thermal communication with each other, and a bypass valve may be arranged fluidly between the compressor and the air side passage to divert cooling air from entering the air side passage to maintain fuel within the fuel side passage in a stable region of a transcritical stability profile based on current operating conditions of the fuel within the fuel side passage.

In some embodiments, the gas turbine engine may include a controller configured to determine a desired cooling air flowrate to be directed through the air side passage based on the transcritical stability profile and the current operating conditions, and to operate the bypass valve to divert a portion of cooling air from entering the air side passage to achieve the desired cooling air flowrate through the cooling side passage.

In some embodiments, the transcritical stability profile may include a comparison between a dimensionless relationship of thermal energy transport and kinetic energy transport ($\pi_e$) and a dimensionless relationship of mean fuel pressure and dynamic fuel pressure ($\pi_f$) within the fuel passage. In some embodiments, the dimensionless relationship of mean fuel pressure and dynamic fuel pressure ($\pi_f$) may be based on a diameter of the fuel passage (D), a density of the fuel ($\rho$), a mean static fuel pressure ($p_{mean}$), and a mass flow rate ($\dot{m}$). In some embodiments, the dimensionless relationship of mean fuel pressure and dynamic fuel pressure ($\pi_f$) may be defined by the equation:

$$\frac{D^4 * \rho * p_{mean}}{\dot{m}^2}.$$

In some embodiments, the dimensionless relationship of thermal energy transport and kinetic energy transport ($\pi_e$) may be based on a diameter of the fuel passage (D), a density of the fuel ($\rho$), a heat input rate ($\dot{Q}$), and a mass flow rate ($\dot{m}$). In some embodiments, the dimensionless relationship of thermal energy transport and kinetic energy transport ($\pi_e$) may be defined by the equation:

$$\frac{D^4 * \rho^2 * \dot{Q}}{\dot{m}^3}.$$

In some embodiments, the stable region may include an area below a curve on a graph having the dimensionless relationship of mean fuel pressure and dynamic fuel pressure ($\pi_f$) on the horizontal axis and the dimensionless relationship of thermal energy transport and kinetic energy transport ($\pi_e$) on the vertical axis, the curve being defined by the equation:

$\pi_e = (8.643\pi_f)^{1.155} - 2.945 \times 10^6$.

In some embodiments, the transcritical stability profile may include a comparison between a heat input rate and a pressure of the fuel within the fuel side passage, the transcritical stability profile defining a stable region and an unstable region of fuel side operations. In some embodiments, the comparison between the heat input rate and the pressure of the fuel may be based on a thermal conductivity of the fuel (k), a diameter of the fuel passage (D), and a ratio of specific heat coefficients of the fuel ($\gamma$). In some embodiments, the heat input rate may be governed by the equation:

$$Nu * \frac{4k}{D^2 * \gamma}.$$

In some embodiments, the thermal conductivity of the fuel (k) may be a mean value. In some embodiments, the ratio of specific heat coefficients of the fuel ($\gamma$) may be a ratio of mean values of specific heat coefficients of the fuel.

In some embodiments, the Nusselt number (Nu) may be governed by the equation: $0.023 * Re^{0.8} * Pr^{0.4}$. In some embodiments, the Reynolds number (Re) may be governed by the equation:

$$\frac{4 * \dot{m}}{\pi * D * \mu}.$$

In some embodiments, the dynamic viscosity ($\mu$) may be a mean value. In some embodiments, the Prandtl number (Pr) may be governed by the equation:

$$\frac{c_p * \mu}{k}.$$

In some embodiments, at least one of the specific isobaric heat coefficient ($c_p$), the dynamic viscosity ($\mu$), and the thermal conductivity (k) may be a mean value.

According to another aspect of the present disclosure, a method of operating a stabilizing heat exchanger of a gas turbine engine providing thermal communication between cooling air as a heat source and fuel as a heat sink to resist supercritical fluid oscillations may include providing a transcritical stability profile of the stabilizing heat exchanger based on a comparison between a heat input rate and a pressure of the fuel, the transcritical stability profile defining a stable region and an unstable region of heat sink operations, determining a desired flowrate of the cooling air directed through the stabilizing heat exchanger that maintains the heat sink operations within the stable region according to current heat sink conditions, and bypassing a portion of the cooling air from entering the stabilizing heat exchanger to maintain the desired flowrate of the cooling air through the stabilizing heat exchanger.

In some embodiments, the stabilizing heat exchanger may be a fuel-to-air heat exchanger having a fuel passage and a cooling air passage in thermal communication with each other, and the transcritical stability profile includes a comparison between the heat input rate and the pressure within the fuel passage of the stabilizing heat exchanger. In some embodiments, the comparison between the heat input rate and the pressure of the fuel may be based on a thermal conductivity of the fuel (k), a diameter of the fuel passage (D), and a ratio of specific heat coefficients of the fuel ($\gamma$). In some embodiments, the heat input rate may be governed by the equation:

$$Nu * \frac{4k}{D^2 * \gamma}.$$

In some embodiments, the thermal conductivity of the fuel (k) may be a mean value. In some embodiments, the ratio of specific heat coefficients of the fuel ($\gamma$) may be a ratio of mean values of specific heat coefficients of the fuel.

In some embodiments, the Nusselt number (Nu) is governed by the equation: $0.023 * Re^{0.8} * Pr^{0.4}$. In some embodiments, the Reynolds number (Re) is governed by the equation:

$$\frac{4 * \dot{m}}{\pi * D * \mu}.$$

In some embodiments, the dynamic viscosity ($\mu$) is a mean value. In some embodiments, the Prandtl number (Pr) may be governed by the equation:

$$\frac{c_p * \mu}{k}.$$

In some embodiments, at least one of the specific isobaric heat coefficient ($c_p$), the dynamic viscosity ($\mu$), and the thermal conductivity (k) may be a mean value.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

In gas turbine engine operation, compressed air may be cooled in a heat exchanger and directed to various portions of the engine to remove heat from the various portions. Fuel-cooled heat exchangers receive fuel as a heat sink (coolant) for heat exchange with the compressed air. In adapted used of gas turbine engines, for example, adapted for use in an aircraft, operational conditions of the fuel can be relatively close to supercritical. Moreover, physical phenomena, such as bulk mode oscillations, can evolve within heat exchangers due to localized and/or instantaneous supercritical conditions that can create instabilities within the flow. Allowing fuel to reach supercritical fuel conditions can be dangerous and/or damaging to heat exchangers and other components of the engine.

Figure 1:
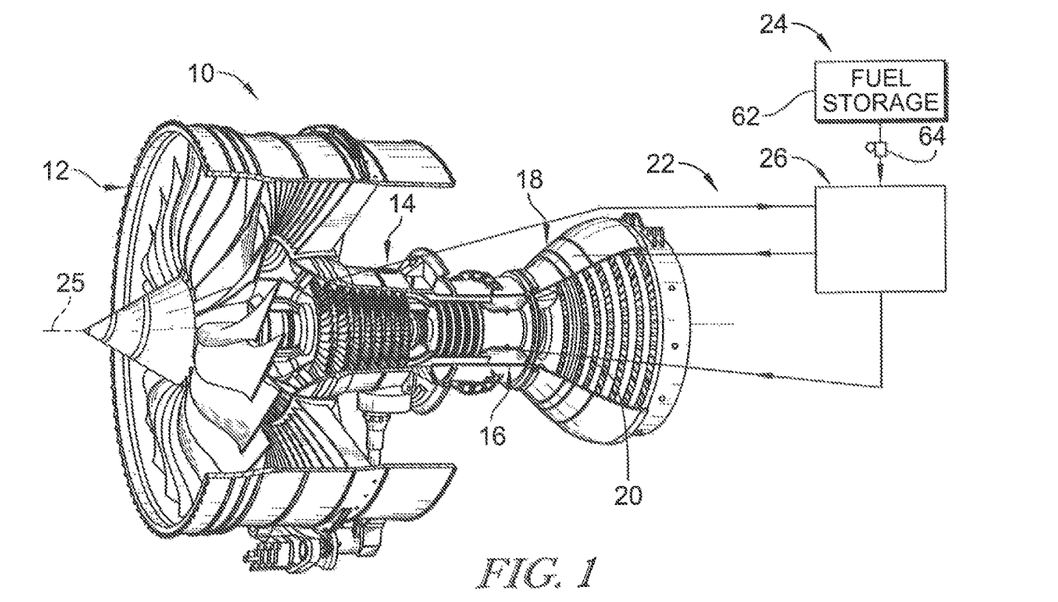
FIG. 1 is a partially diagrammatic view of a turbofan gas turbine engine diagrammatically showing that the gas turbine engine includes a fuel system for providing fuel to the combustor of the engine, a cooling air system for providing cooling air to various portions of the engine, and a stabilizing heat exchanger that passes the cooling air (as a heat source) and the fuel (as a heat sink) in thermal communication with each other to transfer heat from the cooling air to the fuel to maintain heat sink operation within a stable region according to a transcritical stability profile.

An illustrative gas turbine engine 10 includes a fan 12, a compressor 14, a combustor 16, and a turbine 18 as shown in FIG. 1. The fan 12 draws air into the compressor 14 that compresses and delivers the air to the combustor 16. The combustor 16 mixes fuel with the compressed air from the compressor 14 and combusts the mixture. The hot, high-pressure exhaust products of the combustion reaction in the combustor 16 are directed into the turbine 18 to cause turbine blades 20 to rotate about an axis 25 to drive fan 12 and compressor 14.

In the illustrative embodiment, the gas turbine engine 10 includes a compressed air system 22, a fuel system 24, and a stabilizing heat exchanger 26 for governing heat exchange between the systems 22, 24 as shown in FIG. 1. The compressed air system is illustratively embodied as a cooling air system 22 that provides cooling air from the compressor 14 to various portions of the gas turbine engine 10, for example, the turbine blades 20 for removing heat (cooling).

The fuel system 24 illustratively provides fuel as a heat sink to receive heat from the cooling air of the cooling air system 22 before sending the cooling air to those portions of the engine 10 requiring cooling (e.g., turbine blades 20). The stabilizing heat exchanger 26 is configured to regulate heat transfer from the (uncooled) cooling air of the cooling air system 22 (as a heat source) to the fuel of the fuel system 24 (as a heat sink) to maintain stable heat sink operations.

As discussed in detail below with regard to FIG. 3, stable heat sink operations include maintaining fuel within the stabilizing heat exchanger 26 in a stable region as defined by a transcritical stability profile. The transcritical stability profile illustratively defines the boundary between stable and unstable conditions according to a comparison of between a dimensionless relationship of thermal energy transport and kinetic energy transport ($\pi_e$) and a dimensionless relationship of mean fuel pressure and dynamic fuel pressure ($\pi_f$). As explained below, the stabilizing heat exchanger 26 illustratively controls the flowrate of cooling air through the stabilizing heat exchanger 26 (and thus the heat transfer rate to the fuel) so that the fuel as the heat sink remains with the stable region as defined by the transcritical stability profile.

Figure 2:
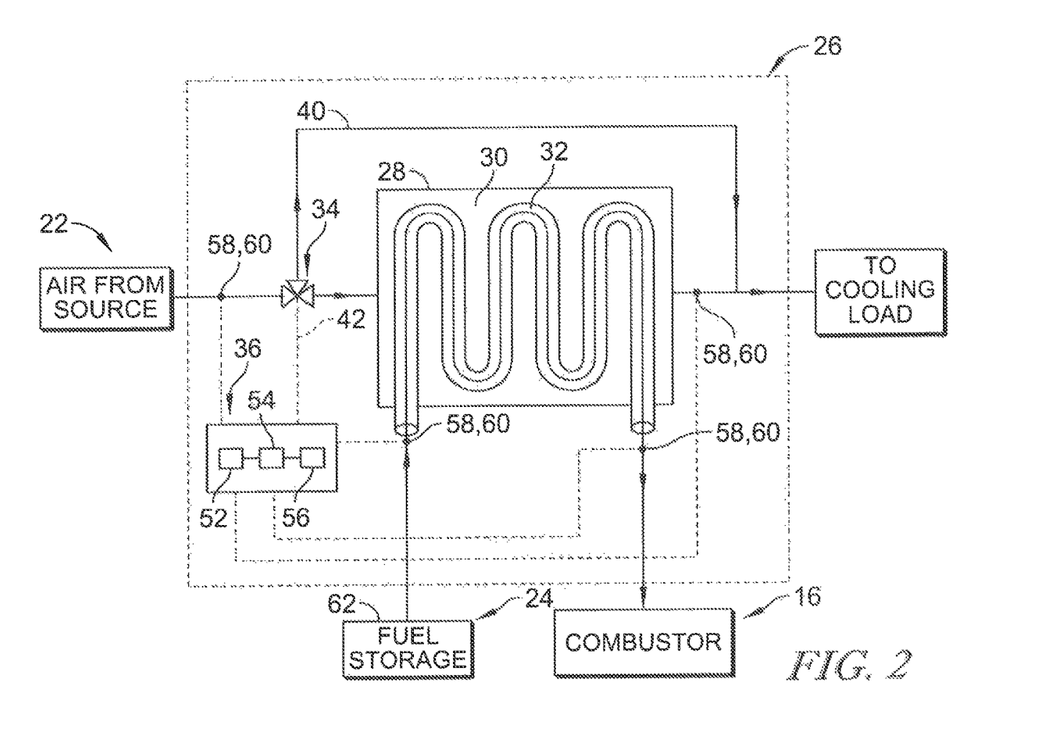
FIG. 2 is a diagrammatic view of an embodiment of the stabilizing heat exchanger of the turbofan gas turbine engine of FIG. 1 showing that the stabilizing heat exchanger includes a cooling air side passage and a fuel side passage arranged in thermal communication with each other, and showing that the stabilizing heat exchanger includes a valve for bypassing a flow of (uncooled) cooling air from entering the stabilizing heat exchanger, and a controller operating the valve to adjust a flowrate of (uncooled) cooling air through the stabilizing heat exchanger to maintain heat sink operation within a stable region according to the transcritical stability profile.

In the illustrative embodiment as shown in FIG. 2, the stabilizing heat exchanger 26 includes a heat exchanger body 28 having a cooling air passage 30 fluidly coupled to receive cooling air from the compressor 14, a fuel passage 32 fluidly coupled to receive fuel from the fuel system 24, a valve 34 disposed to adjust the flowrate of cooling air entering the cooling air passage 30, and a controller 36 configured to govern operation of stabilizing heat exchanger 26. In the illustrative embodiment, the cooling air passage 30 is embodied as a shell side of the stabilizing heat exchanger 26 and the fuel passage 32 is embodied as a tube side including a conduit as the tube. In some embodiments, the cooling air passage 30 and the fuel passage 32 may comprise any suitable manner of heat exchanger arrangement, for example, single pass, multiple pass, tubular, plate-fin, regenerative, extended surface, and/or any combinations thereof.

As shown in FIG. 2, the valve 34 is illustratively embodied as a diverter valve that is arranged to selectively bypass a portion of the cooling air from entering the cooling air passage 30. In the illustrative embodiment, the valve 34 connects to each of a cooling air source 22 (illustratively the discharge of compressor 14), the cooling air passage 30, and a bypass line 40. The valve 34 is configured for selective adjustment to apportion the cooling air received from the compressor 14 between the cooling air passage 30 and the bypass line 40. In the illustrative embodiment, the valve 34 is embodied as an electromechanical valve that is adjustable by signal input to direct a range of flowrate from 0-100% to the cooling air passage 30 with the remainder directed to the bypass line 40. By adjusting the flowrate of cooling air (as a heat source) through the stabilizing heat exchanger 26, the valve 34 regulates the amount of heat input to the fuel (as a heat sink) within the stabilizing heat exchanger 26.

As shown in FIG. 2, the controller 36 communicates with the valve 34 to govern operation of the valve 34 in controlling the flowrate of cooling air through the stabilizing heat exchanger 26. The controller 36 illustratively determines a desired flowrate of cooling air (heat source) to be directed into the cooling air passage 30 to maintain the fuel (as the heat sink) under stable conditions. The controller 36 determines the desired flowrate of cooling air based on the transcritical stability profile.

Figure 3:
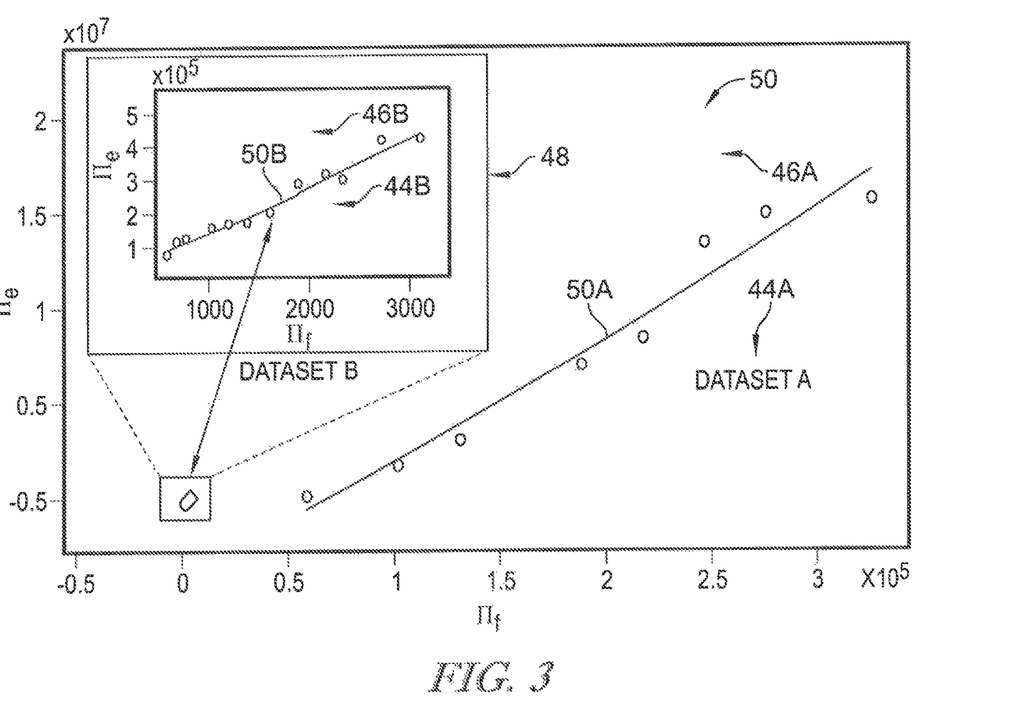
FIG. 3 is an exemplary graph of datasets illustrating transcritical stability profiles defining a stable region and an unstable region of heat sink operation based on comparisons between a dimensionless relationship of thermal energy transport and kinetic energy transport ($\pi_e$) and a dimensionless relationship of mean fuel pressure and dynamic fuel pressure ($\pi_f$)

As shown in FIG. 3, the transcritical stability profile is illustratively embodied as a curve defining a stable region 44A, 44B and an unstable region 46A, 46B for heat sink operations on a graph comparing dimensionless relationships of heat sink parameters. In the illustrative embodiment, the graph as shown in FIG. 3 is embodied as a comparison of the dimensionless relationship of thermal energy transport and kinetic energy transport $(\pi_e)$ and the dimensionless relationship of mean fuel pressure and dynamic fuel pressure $(\pi_f)$.

In the illustrative embodiment, the dimensionless relationship of thermal energy transport and kinetic energy transport $(\pi_e)$ is defined by the equation:

$$\frac{D^4 * \rho^2 * \dot{Q}}{\dot{m}^3},$$

wherein D is embodied as the inner diameter of the fuel passage 32, $\rho$ is embodied as the density of the fuel (heat sink) within the fuel passage 32, $\dot{Q}$ is embodied as the rate of heat input to (heat energy sent to) the fuel (heat sink) within the fuel passage 32, and $\dot{m}$ is embodied as the mass flowrate of fuel (heat sink) through the fuel passage 32.

In the illustrative embodiment, the dimensionless relationship of mean fuel pressure and dynamic fuel pressure $(\pi_f)$ is defined by the equation:

$$\frac{D^4 * \rho * p_{mean}}{\dot{m}^2},$$

wherein D is embodied as the inner diameter of the fuel passage 32, $\rho$ is embodied as the density of the fuel (heat sink) within the fuel passage 32, $p_{mean}$ is embodied as the mean static pressure of the fuel (heat sink) within the fuel passage 32, and $\dot{m}$ is embodied as the mass flowrate of fuel (heat sink) through the fuel passage 32.

As shown in FIG. 3, the transcritical stability profile is illustratively based on a dataset, for example, one of datasets A and B. The datasets A and B illustratively includes data points representing bulk mode instability conditions of certain fuels passing through a conduit to receive heat input. By evaluating the datasets A, B on the basis of a comparison of the dimensionless relationships $(\pi_e)$, $(\pi_f)$, the transcritical stability profile defines stable 44 and unstable 46 regions for heat sink operations for their respective fuels and conditions. In the illustrative embodiment, dataset A includes data points from Palumbo, M., "On the Development of Compact, High Performance Heat Exchangers for Gas Turbine Applications," Purdue University, 2007 ("Palumbo") the contents of which are incorporated by reference in their entirety, and at least including the development of the data points. In the illustrative embodiment, dataset B includes data points from Wang et al. "Experimental Investigation on the Onset of Thermo-acoustic Instability of Supercritical Hydrocarbon Fuel Flowing in a Small-scale Channel" Acta Astronautica 117 (2015) 296-304, Elsevier Inc. ("Wang") the contents of which are incorporated by reference in their entirety, and at least including those portions directed to the development of the data points. In FIG. 3, the dataset B is shown in close up in a window 48 for clarity.

As shown in FIG. 3, the transcritical stability profile illustratively includes a curve (generally 50; and individually 50A, 50B) defined by linear regression of the data points of the dataset. The curve 50A of the transcritical stability profile for the dataset A is illustratively defined by the equation: $\pi_e = (8.643 * \pi_f)^{1.155} - 2.945 \times 10^6$. The curve 50B of the transcritical stability profile for the dataset B is illustratively defined by the equation: $(27.29 * \pi_f)^{0.7186} - 3.12 \times 10^4$. In some embodiments, the curve 50A, 50B may be defined by any suitable technique such as non-linear regression, curve fitting, and/or combination thereof.

In the illustrative embodiment as shown in FIG. 3, the datasets A and B are developed by inducing bulk mode oscillations and recording the individual component parameters of the dimensionless relationships $(\pi_e)$, $(\pi_f)$. The bulk mode oscillations are illustratively developed by maintaining the respective fuel (heat sink) at or above the critical pressure and heating the fuel temperature from below the critical temperature to above the critical temperature. In the illustrative embodiment, heating the fuel temperature from below the critical temperature to above the critical temperature includes heating the temperature from about 80% of the critical temperature to about 120% of the critical temperature. In the illustrative embodiment, the fuel temperature includes the bulk fluid temperature considering film temperature and wall temperature effects.

In the illustrative embodiment, the dataset A indicates bulk mode instability conditions of methanol as the fuel (heat sink) and the dataset B illustratively indicates bulk mode instability conditions for RP-3 rocket fuel as the fuel (heat sink). In some embodiments, the fuel (heat sink) make include any suitable fuel such as methanol, JP-10, MCH, JP-7, DECK RP-1, Jet-A, JP-8, any other hydrocarbon-based fuel, and/or combinations thereof.

Returning now to FIG. 2, the controller 36 illustratively includes a processor 52, a memory device 54, and communications circuitry 56 in communication with each other. The processor 52 illustratively executes instructions stored on the memory device 54 to perform controller 36 functions. In the illustrative embodiment, the instructions include the transcritical stability profile and at least one algorithm for determining the desired flowrate of cooling air passed through the cooling air passage 30 that maintains the heat sink operations within the stable region according to the transcritical stability profile based on the current operating conditions as inputs. In some embodiments, the instructions may include any of a lookup table, chart and/or graphs, and/or any other suitable reference for determining the desired cooling air flowrate and the corresponding position of the valve 34. In the illustrative embodiment, the transcritical stability profile of the instructions corresponds to a single determined fuel type, but in some embodiments, the instructions may include transcritical stability profiles for various fuels and the controller 36 may apply the corresponding transcritical stability profile by manually selection or detection. The processor 52 sends and receives signals through the communications circuitry 56 to communicate with various components of engine 10.

In the illustrative embodiment, the controller 36 determines the desired flowrate of the cooling air and operates the valve 34 to bypass a portion of the cooling air from entering the stabilizing heat exchanger to maintain heat sink operations within the stable region according to the transcritical stability profile. The processor 52 illustratively receives signals from various components of the engine 10 including at least pressure sensors 58 and temperature sensors 60, arranged to determine inlet and outlet conditions of the cooling air and the fuel. In some embodiments, the controller 36 may be in communication with any of engine load sensors, engine speed sensors, turbine temperature and/or pressure sensors, other controllers of the engine 10, and/or any other components of engine 10 to receive indications of current operating conditions.

The controller 36 illustratively determines the desired flowrate of cooling air to be directed through the stabilizing heat exchanger 26 based on the current operating conditions. The processor 52 illustratively executes the instructions stored on the memory device 54 using the current operating parameters as inputs to determine the desired flowrate of cooling air and the corresponding desired position of the valve 34 to achieve the desired cooling air flowrate. The processor 52 illustratively communicates a signal through the communications circuitry 56 to the valve 34 indicating the desired position of the valve 34 to bypass a portion of the cooling air received from the compressor 14 into the bypass line 40 to achieve the desired flowrate of cooling air through the stabilizing heat exchanger 26.

Figure 4:
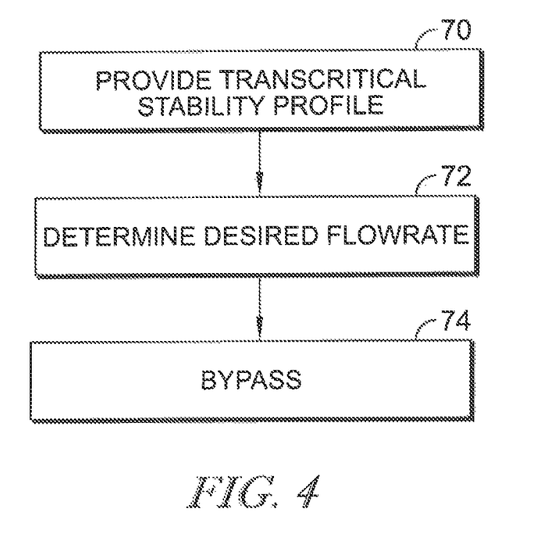
FIG. 4 is a process flow diagram depicting a sequence of operation of the stabilizing heat exchanger of the gas turbine engine of FIG. 1 showing that the controller develops and/or considers the transcritical stability profile, determines a desired flowrate of cooling air through the stabilizing heat changer that maintains the heat sink operations within the stable region according to current operating parameters, and bypasses a portion of cooling air around the stabilizing heat exchanger to maintain the cooling air flowrate through the heat exchanger below the desired flow rate.

As shown in FIG. 4, a process flow diagram includes steps 70-74 for operating the stabilizing heat exchanger 26. In step 70, the transcritical stability profile corresponding to the fuel (heat sink) is stored by the controller 36. In step 72, the determines the desired flowrate of cooling air to be passed through the cooling air passage 30 of the stabilizing heat exchanger 26 based on the current operating conditions and the corresponding desired position of valve 34. In step 74, the controller 36 operates valve 34 to achieve the desired position to bypass a portion of the cooling air received from the compressor 14 from entering the cooling air passage 30 and into the bypass line 40 to achieve the desired flowrate of cooling air through the cooling air passage 32.

Figure 5:
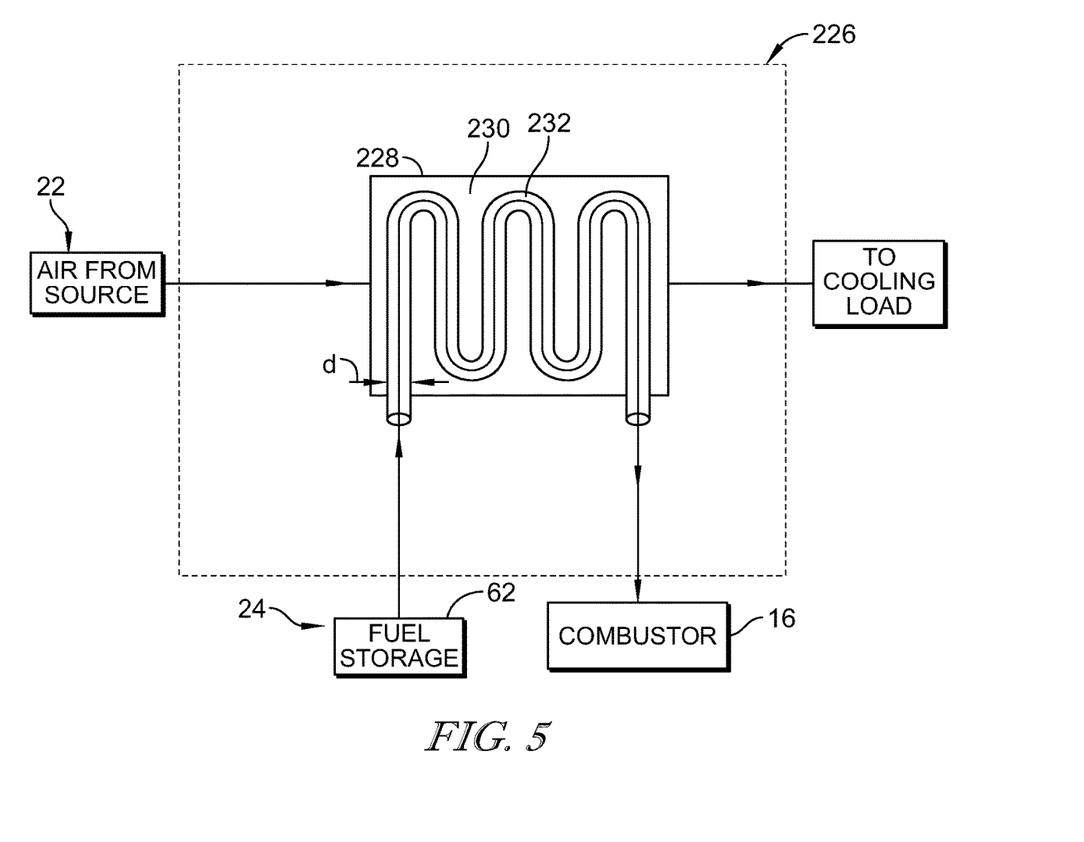
FIG. 5 is a diagrammatic view of another embodiment of the stabilizing heat exchanger of the turbofan gas turbine engine of FIG. 1 showing that the stabilizing heat exchanger includes a cooling air side passage and a fuel side passage arranged in thermal communication with each other, the fuel side passage being shown as a fuel conduit having a diameter sized to maintain fuel passing through the fuel conduit within the stable region of operation as defined by the transcritical stability profile.

As shown in FIG. 5, another illustrative embodiment of a transcritical stabilizing heat exchanger 226 of the gas turbine engine 10 adapted for use in an aircraft. The stabilizing heat exchanger 226 illustratively includes a heat exchanger body 228 having a cooling air passage 230 fluidly connected to receive cooling air (as a heat source) from the cooling air system 22 and a fuel passage 232 fluidly connected to receive fuel (as a heat sink) from the fuel system 24. The cooling air passage 230 and the fuel passage 232 are illustratively disposed in thermal communication with each other.

The stabilizing heat exchanger 226 is similar to the stabilizing heat exchanger 26 as disclosed herein. Accordingly, similar reference numbers in the 200 series indicate features that are common between the stabilizing heat exchanger 226 and the stabilizing heat exchanger 26 unless indicated otherwise. The description of the stabilizing heat exchanger 26 is hereby incorporated by reference to apply to the stabilizing heat exchanger 226 except in instances of conflict with the specific disclosure of the stabilizing heat exchanger 226.

The stabilizing heat exchanger 226 is configured to regulate heat transfer from the cooling air of the cooling air system 22 (as a heat source) to the fuel of the fuel system 24 (as a heat sink) to maintain stable heat sink operations. In contrast to the stabilizing heat exchanger 26, the stabilizing heat exchanger 226 does not include a valve 34, bypass line 40, or controller 36. Instead, the stabilizing heat exchanger 226 illustratively includes the fuel passage 232 embodied as a conduit having an inner diameter d sized to maintain the fuel therein within the stable region 44 as defined by the transcritical stability profile for the entire range of fuel flowrates and heat inputs from the heat source during operation of the engine 10.

In the illustrative embodiment of the stabilizing heat exchanger 226, the inner diameter d of the fuel passage 232 is determined based on the full range of fuel flowrates and heat inputs from the heat source during operation of the engine. In some embodiments, the stabilizing heat exchanger 226 may include the valve 34, bypass line 40, and controller 36 configured to operate to bypass a portion of the cooling air from entering the stabilizing heat exchanger 226 under limited conditions of operations, for example, upon hot startup of the engine 10.

In the illustrative embodiment, the compressed air system 22 includes ducting and relates flow control elements, such as dampers, to provide compressed air from the compressor 14 as a cooling air (heat source) to the stabilizing heat exchanger 26. In some embodiments, the compressed air system 22 may include any suitable number and/or arrangement of ducting, dampers, blowers, and/or other accessories. In some embodiments, the cooling air may include any suitable cooling medium, may be provided from any suitable source, and/or may comprise intermediate mediums between the compressed air and the stabilizing heat exchanger. In the illustrative embodiment, the fuel system 24 includes a reservoir 62, a pump 64, flow control elements and piping to transfer fuel to the stabilizing heat exchanger 26 and the combustor 16. In some embodiments, the fuel system may include any number and/or arrangement of pumps, piping, valves, and accessories for circulating and delivering fuel. In the illustrative embodiment, air streams are transported through appropriate ducting and may include any dampers, blowers, and/or other accessories as required.

Figure 6:
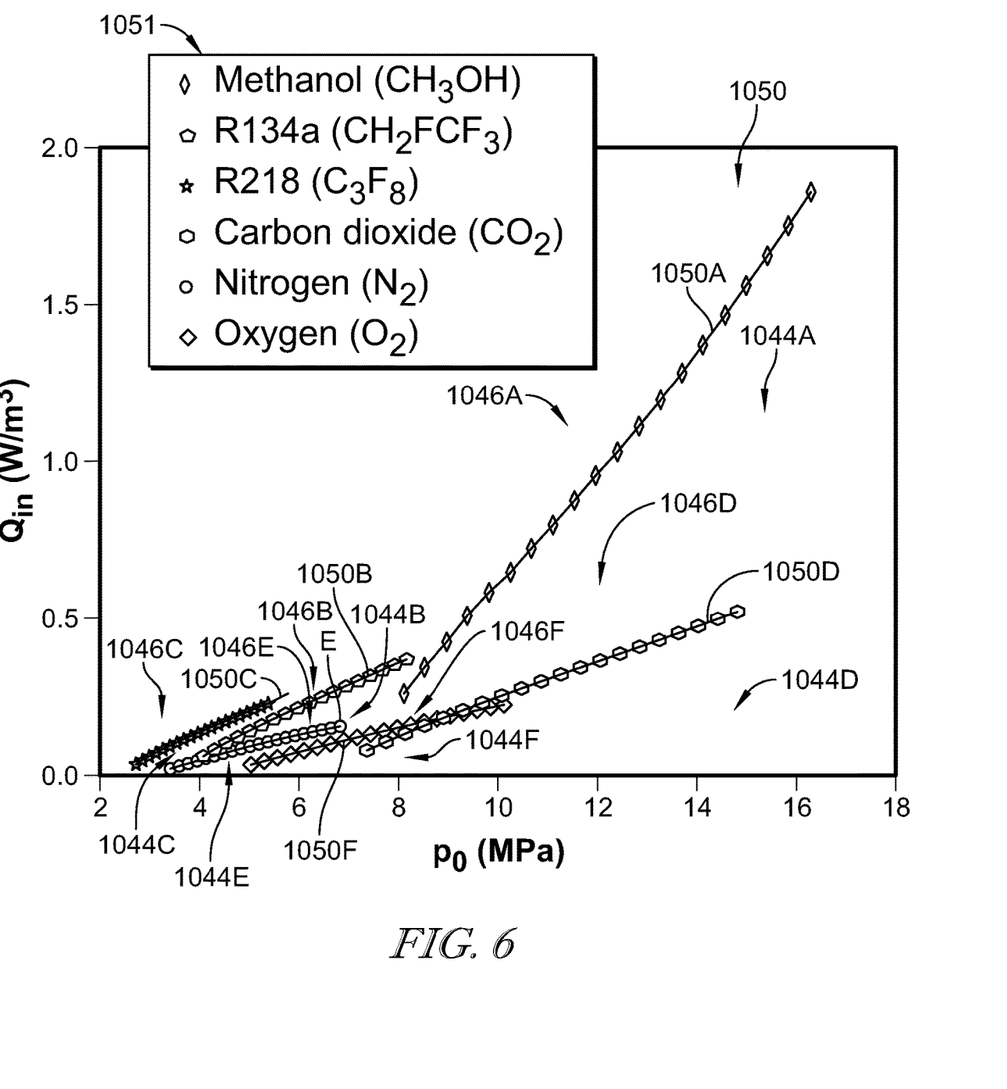
FIG. 6 is an exemplary graph of datasets illustrating transcritical stability profiles defining a stable region and an unstable region of heat sink operation based on comparisons between a heat input and a pressure of the heat sink.

With reference to FIG. 6, another exemplary embodiment of transcritical stability profiles include curves (generally 1050; and individually 1050A, 1050B, 1050C, 1050D, 1050E, 1050F) defining a stable region (generally 1044; and individually 1044A, 1044B, 1044C, 1044D, 1044E, 1044F) and an unstable region (generally 1046; and individually 1046A, 1046B, 1046C, 1046D, 1046E, 1046F) for heat sink operations on a graph comparing relationships of heat sink parameters. In the illustrative embodiment, the graph as shown in FIG. 6 is embodied as a comparison of the heat input ($\dot{Q}$) and the pressure ($p_o$) of the heat sink.

As shown in FIG. 6, the heat input ($\dot{Q}$) and the pressure ($p_o$) are illustratively embodied as presented from the perspective of the heat sink. The heat input ($\dot{Q}$) is illustratively embodied as the actual heat input as received by the heat sink medium. The pressure ($p_o$) is illustratively embodied as the pressure of the heat sink medium. With respect to embodiments in which the heat sink includes the fuel of the gas turbine engine discussed above, the heat input ($\dot{Q}$) is illustratively embodied as the rate of heat energy as received by the fuel within the fuel passages 32, 232 per unit of volume of the fuel, expressed in units of Watts per cubic meter (W/m³); for comparison purposes between the present exemplary embodiment and other descriptions that include heat input $\dot{Q}$ as a parameter, the heat input ($\dot{Q}$) of the present exemplary embodiment may also be referred to as the "Ideal heat input." The pressure ($p_o$) is illustratively embodied as the pressure of the fuel within the fuel passage 32, 232, expressed in units of megapascal (MPa).

With reference to FIG. 6, the transcritical stability profiles 1050 are illustratively governed by a relationship between the heat input ($\dot{Q}$) and the pressure ($p_o$). In the illustrative embodiment, the relationship between the heat input ($\dot{Q}$) and the pressure ($p_o$) is governed by the equation:

$$\dot{Q} = Nu * \frac{4 * \overline{k}}{D^2 * \overline{\gamma}} \Delta T,$$

wherein Nu is embodied as the Nusselt number; k is embodied as the thermal conductivity of the fuel (heat sink) within the fuel passage 32; D is embodied as the diameter of the fuel passage 32, 232; γ is embodied as the ratio of specific isobaric and isochoric heat coefficients $$\frac{c_p}{c_v},$$

wherein $c_p$ is embodied as the specific isobaric heat coefficient of the fuel and $c_v$ is embodied as the specific isochoric heat coefficient of the fuel; and ΔT is embodied as the temperature difference between inlet and outlet of the fuel passage 32, 232 ($T_{outlet} - T_{inlet}$).

In the illustrative embodiment as shown in FIG. 6, the Nusselt number (Nu) is embodied as the Nusselt number for forced convection (Dittus-Boelter equation) governed by the equation: $0.023 * Re^{0.8} * Pr^{0.4}$, wherein the Reynolds number (Re) is governed by the equation:

$$\frac{4 * \dot{m}}{\pi * D * \overline{\mu}},$$

and the Prandlt number (Pr) is governed by the equation:

$$\frac{\overline{c_p} * \overline{\mu}}{\overline{k}},$$

wherein $\dot{m}$ is embodied as the fuel mass flow rate through the fuel passage 32, 232; D is embodied as the diameter of the fuel passage 32, 232; and μ is embodied as the dynamic viscosity of the fuel (heat sink). In the illustrative embodiment, each of the ratio of specific isobaric and isochoric heat coefficients (γ), the dynamic viscosity (u), the specific isobaric heat coefficient ($c_p$), and the thermal conductivity (k) is illustratively embodied as the mean value of parameter (φ, generic parameter) between its value at the inlet ($\varphi_{inlet}$) and outlet ($\varphi_{outlet}$) the fuel passage 32, $$232 \left( \overline{\varphi} = \frac{\varphi_{outlet} + \varphi_{inlet}}{2} \right).$$

As shown in FIG. 6, each transcritical stability profile 1050A, 1050B, 1050C, 1050D, 1050E, 1050F represents the boundary between stable and unstable regions 1044, 1046 for each of the various corresponding heat sink mediums as shown in legend 1051. In the illustrative embodiment, the exemplary heat sink mediums include methanol ($CH_3OH$), R134a ($CH_2FCF_3$), R218 ($C_3F_8$), nitrogen ($N_2$), oxygen ($O_2$), and carbon dioxide ($CO_2$) which respectively correspond to curves 1050A, 1050B, 1050C, 1050D, 1050E, and 1050F. In some embodiments, the heat sink medium may include any suitable substance. Accordingly, the transcritical stability profiles 1050 for each heat sink medium are illustratively determined according to parameters (ρ, μ, k, $c_v$, $c_p$, γ) for each heat sink medium.

For illustration purposes, an example of values for Methanol at a pressure ($p_o$) of 8.527 MPa include:

TABLE 1

| Sample Values for Methanol for $p_0$ = 8.527 MPa | | | |
|---|---|---|---|
| T (K) | 507.514 | 1141.658 | 824.586 |
| ρ (kg/m³) | 318.326 | 28.301 | 173.314 |
| μ ($10^{-5}$ Pa · s) | 4.223 | 2.784 | 3.504 |
| k (W/(m · K)) | 0.1403 | 0.114 | 0.127 |
| $c_p$ (J/(kg · K)) | 11760.333 | 3104.363 | 7432.348 |
| γ | 5.333 | 1.109 | 3.221 |

In the illustrative embodiment, the transcritical stabilizing heat exchanger 26 is operated in accordance with the transcritical stability profiles 1050. The valve 34 of heat exchanger 26 is illustratively operated in accordance with the transcritical stability profiles 1050. In terms of the embodiments described above, the desired flowrate for cooling air (as the heat source) is illustratively determined on the basis of the stability profile 1050, and more specifically, on the basis of the heat input ($\dot{Q}$)

$$\left( i.e., Nu * \frac{4 * \overline{k}}{D^2 * \overline{\gamma}} \Delta T \right),$$

to maintain heat sink operations within the stable region 1044. In the illustrative embodiment, the processor 52 executes instructions stored on the memory 54 to determine the corresponding position of the valve 34 to direct the desired amount of cooling air through the cooling air passage 30 to provide the heat input ($\dot{Q}$). The control system 36 illustratively communicates the desired valve position to the valve 34 for execution. Accordingly, operation of the heat exchanger 26 is conducted according to the transcritical stability profile 1050 to maintain heat sink operations within the stable region 1044.

In another illustrative embodiment, the transcritical stabilizing heat exchanger 226 is formed in accordance with the transcritical stability profiles 1050. The diameter d of the fuel passage 232 of the heat exchanger 226 is illustratively sized in accordance with the transcritical stability profiles 1050. In terms of the embodiments described above, the diameter d of the fuel passage 232 is sized to maintain the fuel therein within the stable region 1044 as defined by the transcritical stability profile 1050 for the entire range of fuel flowrates and heat inputs from the heat source during the operation of the engine 10. In the exemplary scenario of a gas turbine engine 10 adapted for use in aircraft, the diameter d of the fuel passage 232 is sized to maintain the fuel therethrough within the stable region 1044 for all heat inputs and fuel flow rates according to the operational demands of the aircraft operation. In the illustrative embodiment, the diameter d is relatively constant along the extent of the fuel passage 232, but in some embodiments, the diameter d may vary along the extent of the fuel passage 232, for example but without limitation, the diameter d may be tapered to enlarge or decrease in the direction of flow therein and/or may increase, remain steady, and/or decrease in various sections of the fuel passage 232. Accordingly, formation of the heat exchanger 226 is conducted according to the transcritical stability profile 1050 to maintain heat sink operations within the stable region 1044.

As mentioned above, the Ideal heat input $(\dot{Q})$ is illustratively embodiment as the heat energy received by the fuel within the fuel passage 32, 232 from the perspective of the fuel. In comparison, the heat input $\dot{Q}$ has also been illustratively described relative to the transcritical stability profiles and associated curves 50 referred to in FIG. 3 as the rate of heat energy provided to the fuel (heat sink) within the fuel passage 32 from the perspective of the cooling air (heat source). Although the Ideal heat input $(\dot{Q})$ and the heat input $\dot{Q}$ are similar, one non-limiting exemplary distinction between them is that the Ideal heat input $(\dot{Q})$ would represent the heat energy provided to the fuel downstream of the actual heat transfer through the heat exchanger 26, 226, whereas the heat input $\dot{Q}$ would represent the heat energy provided from the heat source upstream of the actual heat transfer through the heat exchanger 26, 226. Accordingly, using the same example, the Ideal heat input $(\dot{Q})$ would represent heat energy values that are independent of system characteristics such as heat losses (inefficiencies) of the heat transfer operation between the heat source and heat sink, whereas the heat input $\dot{Q}$ would represent heat energy values which may still incur heat losses of the heat transfer operation between the heat source and heat sink. Notwithstanding this non-limiting exemplary distinction, reference to heat input and/or heat input rate, including references having one or more of Q, Q, $\dot{Q}$, $(\dot{Q})$, $\dot{Q}$ and/or any other symbol, is not intended to be limited to any particular construction and/or reference point unless indicated otherwise.

The present disclosure includes descriptions of devices, systems, and methods for air-to-fuel heat exchangers of gas turbine engines for operating under aggressive thermal conditions that may result in the onset of destructive transcritical fuel flow instabilities in heat exchanger tubes heated by air flowing over the tubes, and avoiding those onset of those instabilities. The present disclosure includes devices, systems, and methods to arrange data into dimensionless parameters that repeatedly predict the onset of damaging flow instabilities created by physical phenomena. The data may be produced by controlled testing and/or computational analysis methods. The predictive capability disclosed herein may be applied to design and/or operation of various liquid-cooled gas cooling system that contains a gas-to-liquid heat exchanger operating at gas temperatures high enough to heat the liquid (at or above it's critical pressure) above it's critical temperature, thereby creating the possibility of such damaging transcritical flow instabilities.

The present disclosure includes guidance and insight into grouping and treatment of dimensional parameters for several fluids of interest and provides methods to avoid equipment-damaging "stay-out zones" through a combination of design and operating constraints placed on the heat exchange system and its working fluids.

The present disclosure includes liquid-cooled gas cooling devices, systems, and methods having design and operation based on non-dimensional parameters. These non-dimensional parameters—three input parameters and one output parameter—can be used to predict a heated, supercritical fluid flow through a tube as being stable or unstable. Such heated flow can occur, for example, in the air-to-fuel heat exchanger (typically shell-and-tube type) that is a component within an air cooling system of a gas turbine engine. The input parameters are related to the internal diameter of the liquid flow path, liquid inlet density, mean liquid inlet pressure, liquid mass flow rate, and heat input from the gas side. The output parameter is related to predicted pressure oscillation amplitude. The liquid-cooled gas cooling subsystem employs these dimensionless parameters to set gas and liquid mass flowrate targets within the subsystem to maintain stable operation. In some embodiments, these parameters are employed to avoid unstable operation by sizing tube diameters for the nominal operating design point.

The present disclosure includes the use of an aircraft's liquid fuel as a heat sink for gas turbine engine cooling air through use of a fuel-air heat exchanger. In addition to gas turbine engine cooling, the elevated fuel temperatures associated with fuel-based cooling can improve an engine's fuel efficiency. However, when fuel temperatures approach the supercritical regime, large pressure oscillations may occur within fuel flow paths. Such oscillations can damage heat exchanger components. Supercritical fuel oscillations are known to occur at different oscillation modes. Two distinct types of oscillations may occur near the critical point including bulk-mode oscillations (also known as Helmholtz or pulsating oscillations) and acoustic-scale oscillations. Helmholtz oscillations may occur with high amplitude and low frequency (e.g., 0.5-3 Hz), whereas acoustic oscillations may occur with low amplitude and high frequency (e.g., 75-2000 Hz). The present disclosure includes devices, systems, and methods for fuel-air heat exchanger while accounting for bulk-mode oscillations to avoid the potentially damaging effects near supercritical conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of operating a stabilizing heat exchanger of a gas turbine engine including a fuel system adapted to provide fuel to a combustor, a compressor for providing pressurized air to the combustor, and a computer controller for governing operation of a bypass valve, the stabilizing heat exchanger comprising a fuel side passage fluidly coupled with the fuel system and an air side passage fluidly coupled with the compressor to receive the pressurized air as cooling air, the fuel side passage and the air side passage arranged in thermal communication with each other, the bypass valve arranged fluidly between the compressor and the air side passage to selectively divert the cooling air from entering the air side passage, according to the computer controller, providing thermal communication between the cooling air as a heat source and the fuel as a heat sink to resist supercritical fluid oscillations, the method comprising providing a transcritical stability profile of the stabilizing heat exchanger based on a comparison between a dimensionless relationship of mean fuel pressure and dynamic fuel pressure ($\pi_f$) and a dimensionless relationship of thermal energy transport and kinetic energy transport ($\pi_e$) of the fuel, the transcritical stability profile defining a stable region and an unstable region of heat sink operations, determining, via the computer controller, a desired flowrate of the cooling air to be directed through the stabilizing heat exchanger that maintains the heat sink operations within the stable region according to current heat sink conditions, and bypassing, via the bypass valve, a portion of the cooling air from entering the stabilizing heat exchanger to maintain the desired flowrate of the cooling air through the stabilizing heat exchanger.

2. The gas turbine engine of claim 1, wherein the stabilizing heat exchanger is a fuel-to-air heat exchanger having the fuel side passage and the air side passage in thermal communication with each other, and the transcritical stability profile includes the comparison between the dimensionless relationship of thermal energy transport and kinetic energy transport ($\pi_e$) and the dimensionless relationship of mean fuel pressure and dynamic fuel pressure ($\pi_f$) within the fuel passage of the stabilizing heat exchanger.

3. The gas turbine engine of claim 2, wherein the dimensionless relationship of mean fuel pressure and dynamic fuel pressure ($\pi_f$) is based on a diameter of the fuel passage (D), a density of the fuel (p), a mean static fuel pressure ($p_{mean}$) and a mass flow rate ($\dot{m}$).

4. The gas turbine engine of claim 3, wherein the dimensionless relationship of mean fuel pressure and dynamic fuel pressure ($\pi_f$) is defined by the equation:

$$\frac{D^4 * \rho * p_{mean}}{\dot{m}^2}.$$

5. The gas turbine engine of claim 2, wherein the dimensionless relationship of thermal energy transport and kinetic energy transport ($\pi_e$) is based on a diameter of the fuel side passage (D), a density of the fuel (p), a heat input rate ($\dot{Q}$), and a mass flow rate ($\dot{m}$).

6. The gas turbine engine of claim 5, wherein the dimensionless relationship of thermal energy transport and kinetic energy transport ($\pi_e$) is defined by the equation:

$$\frac{D^4 * \rho^2 * \dot{Q}}{\dot{m}^3}.$$

7. The gas turbine engine of claim 1, wherein the stable region includes an area below a curve on a graph having the dimensionless relationship of mean fuel pressure and dynamic fuel pressure ($\pi_f$) on the horizontal axis and the dimensionless relationship of thermal energy transport and kinetic energy transport ($\lambda_e$) on the vertical axis, the curve being defined by the equation:

$\pi_e = (8.643 * \pi_f)^{1.155} - 2.945 \times 10^6.$

8. A gas turbine engine comprising
a fuel system adapted to provide fuel to a combustor of the gas turbine engine in an amount ranging between a minimum and a maximum value according to engine operating parameters,
a compressor for providing pressurized air to the combustor of the gas turbine engine, and
a stabilizing heat exchanger system comprising a stabilizing heat exchanger and a computer controller, the stabilizing heat exchanger including a fuel side passage fluidly coupled with the fuel system to conduct the fuel therethrough, an air side passage fluidly coupled with the compressor to receive at least a portion of the pressurized air therethrough as cooling air, the fuel side passage and the air side passage being arranged in thermal communication with each other, and a bypass valve arranged fluidly between the compressor and the air side passage, the computer controller governs positioning of the bypass valve to selectively divert the cooling air from entering the air side passage, wherein the computer controller is configured to determine a desired position of the bypass valve which maintains the fuel within the fuel side passage in a stable region of a transcritical stability profile based on current operating conditions of the fuel within the fuel side passage, the transcritical stability profile comprising a comparison between a dimensionless relationship of thermal energy transport and kinetic energy transport ($\pi_e$) and a dimensionless relationship of mean fuel pressure and dynamic fuel pressure ($\pi_f$) within the fuel side passage.

9. The gas turbine engine of claim 8, wherein the computer controller is configured to determine a desired cooling air flowrate to be directed through the air side passage based on the transcritical stability profile and the current operating conditions, and to operate the bypass valve to divert a portion of the cooling air from entering the air side passage to achieve the desired cooling air flowrate through the air side passage.

10. The gas turbine engine of claim 8, wherein the dimensionless relationship of mean fuel pressure and dynamic fuel pressure ($\pi_f$) is based on a diameter of the fuel side passage (D), a density of the fuel (p), a mean static fuel pressure ($p_{mean}$), and a mass flow rate ($\dot{m}$).

11. The gas turbine engine of claim 10, wherein the dimensionless relationship of mean fuel pressure and dynamic fuel pressure ($\pi_f$) is defined by the equation:

$$\frac{D^4 * \rho * p_{mean}}{\dot{m}^2}.$$

12. The gas turbine engine of claim 8, wherein the dimensionless relationship of thermal energy transport and kinetic energy transport ($\pi_e$) is based on a diameter of the fuel side passage (D), a density of the fuel (p), a heat input rate ($\dot{Q}$), and a mass flow rate ($\dot{m}$).

13. The gas turbine engine of claim 12, wherein the dimensionless relationship of thermal energy transport and kinetic energy transport ($\pi_e$) is defined by the equation:

$$\frac{D^4 * \rho^2 * \dot{Q}}{\dot{m}^3}.$$

14. The gas turbine engine of claim 9, wherein the stable region includes an area below a curve on a graph having the dimensionless relationship of mean fuel pressure and dynamic fuel pressure ($\pi_f$) on the horizontal axis and the dimensionless relationship of thermal energy transport and kinetic energy transport ($\pi_e$) on the vertical axis, the curve being defined by the equation:

$$\pi_e = (8.643 * \pi_f)^{1.155} - 2.945 \times 10^6.$$

15. The gas turbine engine of claim 8, wherein the transcritical stability profile includes a comparison between a heat input rate and a pressure of the fuel within the fuel side passage, the transcritical stability profile defining the stable region and an unstable region of the current operating conditions of the fuel within the fuel side passage.

16. The gas turbine engine of claim 15, wherein the comparison between the heat input rate and the pressure of the fuel is based on a thermal conductivity of the fuel (k), a diameter of the fuel passage (D), and a ratio of specific heat coefficients of the fuel ($\gamma$).

17. The gas turbine engine of claim 15, wherein the heat input rate is governed by the equation:

$$Nu * \frac{4k}{D^2 * \gamma}.$$

18. The gas turbine engine of claim 17, wherein at least one of a thermal conductivity of the fuel (k) is a mean value and a ratio of specific heat coefficients of the fuel ($\gamma$) is a ratio of mean values of the specific heat coefficients of the fuel.

19. The gas turbine engine of claim 17, wherein the Nusselt number (Nu) is governed by the equation:

$$0.023 * Re^{0.8} * Pr^{0.4}.$$

20. The gas turbine engine of claim 19, wherein the Reynolds number (Re) is governed by the equation:

$$\frac{4 * \dot{m}}{\pi * D * \mu}.$$

21. The gas turbine engine of claim 20, wherein a dynamic viscosity ($\mu$) is a mean value.

22. The gas turbine engine of claim 19, wherein the Prandtl number (Pr) is governed by the equation:

$$\frac{c_p * \mu}{k}.$$

23. The gas turbine engine of claim 22, wherein at least one of a specific isobaric heat coefficient ($c_p$), a dynamic viscosity ($\mu$), and a thermal conductivity (k) is a mean value.

24. A method of operating a stabilizing heat exchanger of a gas turbine engine including a fuel system adapted to provide fuel to a combustor, a compressor for providing pressurized air to the combustor, and a computer controller for governing operation of a bypass valve, the stabilizing heat exchanger comprising a fuel side passage fluidly coupled with the fuel system and an air side passage fluidly coupled with the compressor to receive the pressurized air as cooling air, the fuel side passage and the air side passage arranged in thermal communication with each other, the bypass valve arranged fluidly between the compressor and the air side passage to selectively divert the cooling air from entering the air side passage, according to the computer controller, providing thermal communication between the cooling air as a heat source and the fuel as a heat sink to resist supercritical fluid oscillations, the method comprising providing a transcritical stability profile of the stabilizing heat exchanger based on a comparison between a dimensionless relationship of mean fuel pressure and dynamic fuel pressure ($\pi_f$) and a dimensionless relationship of thermal energy transport and kinetic energy transport ($\pi_e$) within the fuel side passage, the transcritical stability profile defining a stable region and an unstable region of heat sink operations, determining, via the computer controller, a desired flowrate of the cooling air to be directed through the stabilizing heat exchanger that maintains the heat sink operations within the stable region according to current heat sink conditions, and bypassing, via the bypass valve, a portion of the cooling air from entering the stabilizing heat exchanger to maintain the desired flowrate of the cooling air through the stabilizing heat exchanger.

25. The gas turbine engine of claim 24, wherein the stabilizing heat exchanger is a fuel-to-air heat exchanger having the fuel passage and the air side passage in thermal communication with each other, and the transcritical stability profile includes a comparison between a heat input rate and a pressure within the fuel side passage of the stabilizing heat exchanger.

26. The method of claim 25, wherein the comparison between the heat input rate and the pressure of the fuel is based on a thermal conductivity of the fuel (k), a diameter of the fuel side passage (D), and a ratio of specific heat coefficients of the fuel ($\gamma$).

27. The method of claim 25, wherein the heat input rate is governed by the equation:

$$Nu * \frac{4k}{D^2 * \gamma}.$$

28. The method of claim 27, wherein at least one of a thermal conductivity of the fuel (k) is a mean value and a ratio of specific heat coefficients of the fuel ($\gamma$) is a ratio of mean values of specific heat coefficients of the fuel.

29. The method of claim 27, wherein the Nusselt number (Nu) is governed by the equation:

$$0.023 * Re^{0.8} * Pr^{0.4}.$$

30. The method of claim 29, wherein the Reynolds number (Re) is governed by the equation:

$$\frac{4 * \dot{m}}{\pi * D * \mu}.$$

31. The method of claim 30, wherein a dynamic viscosity ($\mu$) is a mean value.

32. The method of claim 29, wherein the Prandtl number (Pr) is governed by the equation:

$$\frac{c_p * \mu}{k}.$$

33. The method of claim 32, wherein at least one of a specific isobaric heat coefficient ($c_p$), a dynamic viscosity ($\mu$), and a thermal conductivity (k) is a mean value.

* * * * *